US006834877B2

(12) United States Patent
Lesage et al.

(10) Patent No.: US 6,834,877 B2
(45) Date of Patent: Dec. 28, 2004

(54) REAR SUSPENSION OF A VEHICLE WITH DRIVE WHEEL BORNE BY AN OSCILLATING ARM

(75) Inventors: Philippe Lesage, 115, avenue de la Fonit, 77190 Dammarie les Lys (FR); Emmanuel Antonot, Clenay (FR)

(73) Assignee: Philippe Lesage, Dammarie des Lys (FR)

( * ) Notice: Subject to any disclaimer, the term of this patent is extended or adjusted under 35 U.S.C. 154(b) by 0 days.

(21) Appl. No.: 10/469,298

(22) PCT Filed: Mar. 1, 2002

(86) PCT No.: PCT/FR02/00736
§ 371 (c)(1),
(2), (4) Date: Aug. 29, 2003

(87) PCT Pub. No.: WO02/070332
PCT Pub. Date: Sep. 12, 2002

(65) Prior Publication Data
US 2004/0070169 A1 Apr. 15, 2004

(30) Foreign Application Priority Data
Mar. 1, 2001 (FR) .............................................. 01 02778

(51) Int. Cl.[7] .............................................. B62K 25/28
(52) U.S. Cl. ..................................................... 280/284
(58) Field of Search ................................ 280/283–286, 280/288

(56) References Cited

U.S. PATENT DOCUMENTS

| | | | |
|---|---|---|---|
| 5,244,224 A | * | 9/1993 | Busby ........................ 280/284 |
| 5,409,249 A | | 4/1995 | Busby |
| 5,452,910 A | | 9/1995 | Harris |
| 5,791,674 A | | 8/1998 | D'Aluisio et al. |
| 5,957,473 A | * | 9/1999 | Lawwill ...................... 280/284 |
| 6,076,845 A | * | 6/2000 | Lawwill et al. ............. 280/284 |
| 6,102,421 A | * | 8/2000 | Lawwill et al. ............. 280/284 |
| 6,488,301 B2 | * | 12/2002 | Klassen et al. ............. 280/284 |
| 6,619,684 B2 | * | 9/2003 | Miyoshi ...................... 280/283 |
| 2003/0038450 A1 | * | 2/2003 | Lam ........................... 280/284 |
| 2003/0160421 A1 | * | 8/2003 | Assier ........................ 280/283 |

FOREIGN PATENT DOCUMENTS

| | | | | |
|---|---|---|---|---|
| DE | 004217058 A1 | * | 5/1992 | ........... B62K/19/30 |
| DE | 94 16 803 | | 12/1994 | |
| DE | 299 09 626 | | 9/1999 | |
| EP | 1 026 073 | | 8/2000 | |
| FR | 2 774 966 | | 8/1999 | |
| FR | 2 776 981 | | 10/1999 | |

* cited by examiner

Primary Examiner—Avraham Lerner
(74) Attorney, Agent, or Firm—Young & Thompson (57) ABSTRACT

A vehicle rear suspension includes an underframe (1), a swing arm (15) integral with the underframe (1) bearing the axle of a drive wheel (19) hub and a shock-absorber (24), the torque drive being transmitted to the drive wheel (19) by chain (21) and pinion gears. The underframe (1) and/or the swing arm (15) comprises elements enabling the upper strand (22) of the transmission chain (21) or the straight line extending it, to pass through the instantaneous center of rotation C of the swing arm (15), when the vehicle is in position of static equilibrium, and enabling the upper strand (22) of the chain (21) to be located above the instantaneous center of rotation C when the hub of the drive wheel (19) is located above its position of static equilibrium.

13 Claims, 5 Drawing Sheets fig.1 fig. 2 fig. 3 fig. 5 fig. 4 fig. 6 fig. 7 fig.8

REAR SUSPENSION OF A VEHICLE WITH DRIVE WHEEL BORNE BY AN OSCILLATING ARM

The present invention concerns a rear suspension for a vehicle such as a bicycle, motorcycle or similar, of the type comprising a chassis, hereafter called an underframe, a swing arm integral with the underframe and bearing the hub axle of a rear drive wheel, and a shock absorber whose ends are respectively integral with the underframe and swing arm, said suspension providing an "anti-bobbing" effect and leaving clear the space between the seat and rear wheel to allow the fixation of a mud guard, carrier rack or similar.

In the area of mountain-biking, called MTB, rear suspensions are well known comprising a swing arm articulated in the lower part of the seat tube cooperating with a shock absorber. This is the case, for example, with the "XC FULL" bike marketed by LAPIERRE; the swing arm pivots around a fixed axle parallel to the axle of the engaging sprocket which is borne by the crankset positioned at the intersection between the down tube and the seat tube. In addition, the ends of the shock absorber are integral with the swing arm and respectively with the top tube connecting the seat tube to the bicycle fork or an intermediate tube extending globally from the crankset to the top tube, said seat tube being non-continuous to allow passage of the shock absorber.

This type of rear suspension has the disadvantage of taking up the space at the rear of the bicycle, i.e. the space between the rear wheel and the seat, so that it is impossible to fix a rear mudguard, being the cause therefore of various projections of mud, water, etc. onto the cyclist's back in the event of rain for example. Also, in the event of sudden fast pedalling, such as cranking to pick up speed or if the cyclist stands on the pedals when climbing a hill etc., this type of rear suspension gives rise to a so-called "bobbing effect" leading to cyclic bouncing of the suspension even on level ground. Therefore, in addition to the cycling discomfort this causes, part of the torque drive provided by the cyclist is dispersed in the shock absorber instead of contributing to the momentum of the bicycle.

With this type of rear suspension, the upper tensioned strand of the transmission chain extending between the engaging sprocket, borne by the crankset, and the engaged sprocket, integral with the rear drive wheel, extends above the rotation axle of the swing arm relative to the underframe thereby setting up a torque proportional to the tension of the upper strand and at a distance which separates the upper strand of the chain from the centre of rotation of the swing arm, which tends to cause the swing arm to pivot upwards thereby compressing the shock absorber when the cyclist pushes on the pedals, the bicycle being in static equilibrium, i.e. when mounted by a cyclist. When the torque drive applied to the pedals by the cyclist is relatively low and constant, the drive applied to the swing arm and consequently the downward movement of the shock absorber are equally small and constant, so that the cyclist does not perceive any bobbing effect even though part of the torque drive is dispersed within the shock absorber, thereby reducing the efficacy of pedalling. However, when the cyclist pedals harder or when the cyclist stands on the pedals to pick up speed, the position of the centre of gravity of the bicycle/cyclist pair varies; this causes a vertical oscillating movement of the bicycle frame so that the torque drive is suddenly increased, causing an increase in the drive applied to the swing arm which compresses the shock absorber and gives rise to the bobbing effect rapidly perceived by the cyclist. Therefore when pedalling energetically there is a strong increase in the torque drive which becomes cyclical and with each pedal movement it increases the drive applied to the swing arm which compresses the shock absorber giving rise to a bobbing effect, the latter being characterized by a parasitic alternate compression movement of the bicycle's front and rear suspensions in rhythm with the rate of pedalling which hampers the cyclist.

To overcome this disadvantage, a bicycle rear suspension has already been imagined which provides a so-called "anti-bobbing" effect; this is the case for example in French patent FR 2.774.966 filed by the Applicant describing a rear bicycle suspension comprising a swing arm guided by two connecting rods. The orientation of the two rods is set such that the intersection of their respective axes passing through the centre of their two pivots, said intersection materializing the instantaneous centre of rotation of said swing arm, is positioned in the upper anterior quadrant of the point defined by a horizontal axis and a vertical axis converging towards the centre of the crankset, and are articulated on said swing arm at two points notably distant from one another. The suspension also comprises a shock absorber whose ends are respectively integral with the swing arm and the seat tube, said shock absorber extending globally parallel to said seat tube at its rear.

Even though this type of suspension provides an anti-bobbing effect, it has the disadvantage of taking up space at the rear of the bicycle so that it is not possible to fix a rear mudguard, carrier rack or similar. Also, even though this type of suspension provides a particularly effective anti-bobbing effect, it nevertheless has the disadvantage of imparting insufficient rigidity to the underframe/suspension assembly which, when intensive demand is placed on the bicycle, is detrimental to the general performance of the bicycle making it uncomfortable.

One of the purposes of the invention is therefore to overcome these disadvantages by putting forward a rear suspension for a bicycle, or similar, formed of a swing arm connecting the axle of the rear wheel to the upright of the underframe, and a shock absorber whose ends are integral with the underframe and swing arm respectively, said underframe and/or swing arm comprising means making it possible to clear the space between the seat and rear wheel to allow fixation of a rear mudguard or a carrier rack for example, while providing an anti-bobbing effect.

For this purpose, the invention provides for an anti-bobbing system of the rear suspension of a vehicle, such as a bicycle, motorcycle or similar, of the type comprising an underframe, swing arm integral with the underframe bearing the hub axle of a drive wheel, and a shock absorber whose ends are respectively integral with the underframe and swing arm, the torque drive being transmitted to the drive wheel via a chain extending between an engaging sprocket integral with the underframe and an engaged sprocket integral with the hub axle of the drive wheel, said chain between the engaging and engaged sprockets forming two strands, an upper tensioned strand transmitting the torque drive to the drive wheel and a lower so-called return strand, the underframe formed of a globally vertical seat tube, a top tube and a down tube, the top tube and the down tube being integral with a head or steering tube bearing a fork, the axle of the engaging sprocket being positioned at the intersection of the seat tube and down tube and/or the swing arm comprising means so that the upper strand of the transmission chain or the straight line extending it passes through the instantaneous centre of rotation C of the swing arm when the vehicle is in a position of static equilibrium and so that said upper strand of the chain is located below the instantaneous centre of C of the swing arm when the hub of the drive wheel is located above its reference position Pr corresponding to the position of the hub axle of the drive wheel when the vehicle is in a position of static equilibrium. The rear suspension is remarkable in that the swing arm is made integral via at least two articulation means with the underframe whose intersection of the straight lines D1, D2 passing through the rotation axles of each articulation means is positioned in the upper posterior quadrant of a point defined by a horizontal axis H and a vertical axis V converging towards to the axle of the engaging sprocket and in that the ends of the shock absorber are respectively integral with the swing arm or the articulation means joining the swing arm to the down tube, and with a hanger of the down tube, said hanger extending along the plane containing the underframe tubes, said shock absorber extending in front of the down tube i.e. between the down tube and the fork bearing the front wheel, globally parallel to the latter or between the tubes forming the underframe in the plane containing the latter.

It is can be easily understood that when the vehicle is ridden over perfectly level ground, the upper strand of the transmission chain passing through the instantaneous rotation centre of the swing arm, i.e. the rotation centre of the swing arm at each time t, the entirety of the torque drive is transmitted to the drive wheel, and that when the cyclist changes rhythm and pedals harder for example the upper strand of the chain being located below the instantaneous rotation centre of the swing arm, a restoring moment is set up proportional to the tension of the upper strand of the chain and at a distance separating the upper strand and the instantaneous centre of rotation of the swing arm, which tends to return the swing arm to its initial position. This restoring moment is set up whenever the cyclist pedals harder, thereby avoiding the onset of the bobbing effect. Obviously, when overcoming an obstacle, the restoring moment adds itself to the restoring force of the shock absorber, considerably improving motive power when climbing hills for example. Also, unlike the teaching of French patent FR 2.774.966 in which the instantaneous centre of rotation of the swing arm is located in the upper anterior quadrant of the bicycle, the position of the instantaneous centre of rotation is located in the upper posterior quadrant and the position of the shock absorber on the down tube of the bicycle imparts greater rigidity to the underframe/suspension assembly making it possible to clear the space between the rear wheel and the seat so as to fix a rear mudguard, carrier rack or similar.

According to one particularly advantageous characteristic of the rear suspension of the invention, the instantaneous centre of rotation of the swing arm moves globally along a straight line perpendicular to the upper strand of the chain when the hub axle of the drive wheel moves, so that the restoring moment is proportional to the movement of the hub axle of the drive wheel.

Other advantages and characteristics will become better apparent in the following description of several variants of embodiment, given as non-limitative examples, of the rear suspension of the invention with reference to the appended drawings in which.

With reference to the figures, a rear suspension is described below, as a non-restrictive example, that is fitted to a bicycle of MTB type.

Figure 1:
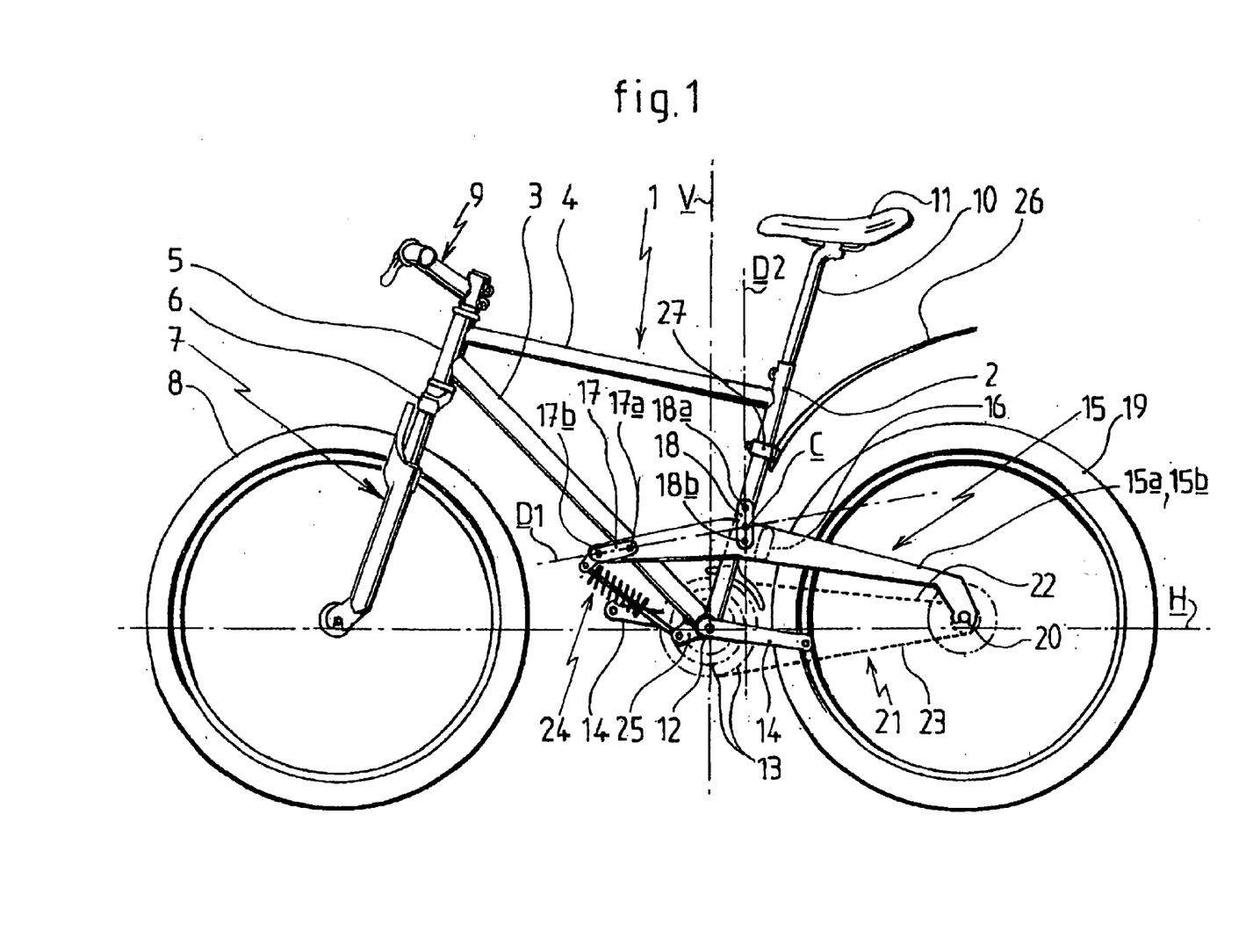
FIG. 1 is a side view of a bicycle equipped with a rear suspension of the invention.

In this respect, FIG. 1 shows a general side view of a bicycle comprising a triangular chassis called an underframe 1 formed of a globally vertical seat tube 2, a down tube 3 assembled by welding to the lower end of seat tube 2, and a top tube 4 assembled to the upper end of seat tube 2 and to a globally vertical fork tube 5, down tube 3 also being made integral with said fork tube 5 by welding. The latter bears a fork 6 comprising a suspension 7 of telescopic type bearing at its lower end the hub axle of front wheel 8. Handlebars 9 are, in conventional manner, made integral with the upper end of fork 6 to ensure bicycle steering. Also, seat tube 2 is able to house a seat post 10 having a seat 11 at its upper end on which the cyclist takes position. The lower end of seat tube 2, and more precisely at the intersection of down tube 3 and seat tube 2, comprises a crankset 12 bearing the axle of engaging sprockets 13 commonly called chainwheels, whose rotation axles are coaxial, pedals 14 being integral with said axle of the engaging sprockets either side of underframe 1 of the bicycle.

In addition, the bicycle comprises a swing arm 15 formed of two semi-arms 15a and 15b extending horizontally either side of underframe 1, said semi-arms 15a and 15b being connected by one or more stays 16. Swing arm 15 is integral with underframe 1 via two connecting rods 17 and 18, rod 17 comprising two rotation axles 17a and 17b respectively integral with down tube 3 and swing arm 15, and connecting rod 18 also comprising two rotation axles 18a and 18b respectively integral with seat tube 2 and swing arm 15. Also, swing arm 15 at its free end carries the hub axle of a rear drive wheel 19 and of an engaged sprocket 20 integral with said rear wheel 19, the latter being driven in rotation by a transmission chain 21 extending between engaging sprocket 13 and engaged sprocket 20 forming two strands, one so-called tensioned upper strand 22 which transmits the torque drive to rear wheel 19 and the other lower so-called return strand 23. In this particular example of embodiment, connecting rod 18 extends globally vertically and connecting rod 17 extends globally horizontally, so that rods 17 and 18 extend substantially perpendicular relative to one another and the intersection of the straight line D1 passing through axles 17a and 17b of rod 17 and of straight line D2 passing through axles 18a and 18b of rod 18 is positioned in the upper posterior quadrant of a point defined by a horizontal axis H and a vertical axis V converging towards the axle of engaging sprocket 13, i.e. point C is positioned above horizontal axis H and on the right of vertical axis V. It will be noted in addition that point C forms the instantaneous centre of rotation of swing arm 15, the instantaneous centre of rotation C being the point around which swing arm 15 pivots at each time t.

Finally, the bicycle comprises a shock absorber 24 whose ends are respectively integral with the distal end of connecting rod 17, i.e. the end furthest distant from its axle 17a, and with a hanger 25 welded to down tube 3 in the vicinity of crankset 12, said hanger 25 extending along the plane containing tubes 2 to 5 of underframe 1.

Therefore, shock absorber 24 extends in front of down tube 3, i.e. between said down tube 3 and the fork bearing the front wheel, globally parallel to the latter.

Evidently, shock absorber 24 may be made integral with the swing arm and with a hanger welded to one of the tubes of underframe 1, and it may extend between tubes 2, 3 and 4 of underframe 1 along the plane containing the latter or behind seat tube 2 parallel to it, while remaining within the scope of the invention.

The space between rear wheel 19 and the seat assembly, i.e. seat tube 2, seat post 10 and seat 11, is therefore cleared making it possible to fix a mudguard 26, shown in dotted lines, to seat tube 2 via a collar 27 positioned between top tube 4 and connecting rod 18, to prevent the spraying of mud, water, gravel etc. onto the cyclist's back.

Evidently in lieu and stead, or in addition to, mudguard 26, a carrier rack can be fixed behind the seat assembly 2,10,11 above rear wheel 19.

Figure 2:
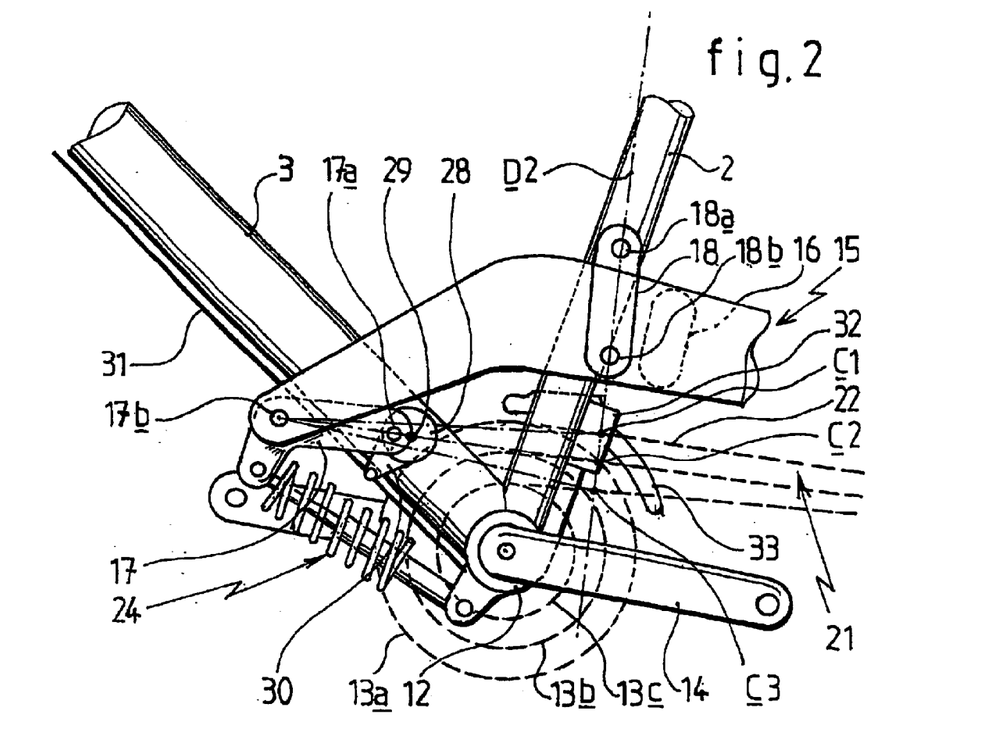
FIG. 2 is a partial side view of a first variant of embodiment of a rear suspension according to the invention fitted to a bicycle.

According to one variant of embodiment of the anti-bobbing system of the invention, and with reference to FIG. 2, the rotation axle 17a of connecting rod 17, making swing arm 15 integral with down tube 3, is mounted loosely on an eccentric 28 pivoting about an axle 29 parallel to the axle of engaging sprockets 13, said eccentric 28 being integral with down tube 3, and the rotation axle 17b of connecting rod 17 being integral with swing arm 15. Also, eccentric 28 comprises an arm 30 whose free end is made integral by any known means to a tensioned cable 31, extending parallel to down tube 3 in front of the latter connected to a control box 32 of a derailleur 33 enabling the chain to be passed from a first sprocket 13a, so-called large chainwheel to a second sprocket 13b, so-called middle chainwheel, or towards a third sprocket 13c, so-called small chainwheel, said cable 31 passing underneath crankset 12. Therefore chain 21 being initially on the large chainwheel 13a corresponding to position $C_1$ of the instantaneous centre of rotation of swing arm 15, the slacking of cable 31 allowing changeover of chain 21 from large chainwheel 13a to middle chainwheel 13b causes rotation of eccentric 28 in anti-clockwise direction, driving connecting rod 17 in rotation about its axle 17b in clockwise direction so that the instantaneous centre of rotation $C_2$ corresponding to straight line D1 passing through rotation axles 17a and 17b of rod 17 and of straight line D2 passing through rotation axles 18a and 18b of rod 18 is positioned on the upper strand 22 of chain 21 driven by intermediate chainwheel 13b. In addition, further slacking of cable 31 of derailleur 32 enabling changeover of chain 21 from middle chainwheel 13b to small chainwheel 13c causes rotation of eccentric 28 in anti-clockwise direction driving rod 17 in rotation about its axle 17b in clockwise direction until the instantaneous centre of rotation $C_3$ of the swing arm is on the upper strand of chain 21. The orientation of rod 18 remaining globally invariable during these chainwheel changeovers, positions $C_1$, $C_2$ and $C_3$ of the instantaneous centre of rotation of swing arm 15 are positioned on the straight line D2 passing through the rotation axles 18a and 18b of said rod 18. Also, it is easily understood that tensioning of cable 31 of derailleur 32 makes it possible to change from positions $C_3$ to $C_2$ then from $C_2$ to $C_1$ by rotation in clockwise direction of eccentric 28 driving rod 17 in rotation relative to its axle 17b in anti-clockwise direction when changing from small chainwheel 13c to middle chainwheel 13b and respectively when changing from middle chainwheel 13b to large chainwheel 13a.

Evidently the means for varying the positions of the instantaneous centre of rotation C described above can be adapted to the rotation axle 18a of connecting rod 18 joining swing arm 15 to seat tube 2, while remaining within the scope of the invention.

Also, the means for varying the position of the instantaneous centre of rotation C of swing arm 15 may evidently be piloted by the command means of front derailleur 32 and/or a rear derailleur not shown in the figures. In addition, the means for varying the position of the instantaneous centre of rotation C of swing arm 15 may consist of means for varying the stiffness of shock absorber 24, such variation in stiffness causing a variation in the length of the stem of shock absorber 24, which drives rods 17 and 18 in rotation, and consequently displaces the instantaneous centre of rotation C so that it moves along straight line D2.

Figure 3:
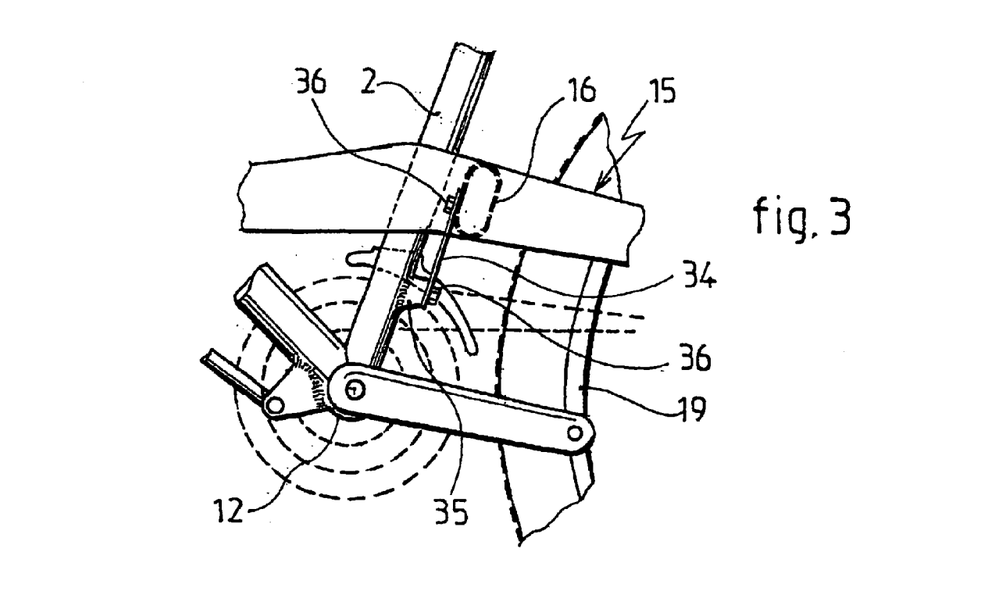
FIG. 3 is a partial side view of a second variant of embodiment of a rear suspension according to the invention fitted to a bicycle.

Also, and according to a second variant of embodiment of the anti-bobbing suspension according to the invention, and with reference to FIG. 3, connecting rod 18 making swing arm 15 integral with seat tube 2 can advantageously be replaced by a flexible thin plate 34 such as a plate in stainless steel, in carbon fibre composite or similar material, whose ends are integral with stay 16 of swing arm 15 and with a boss 35 of seat tube 2 positioned between the crankset 12 and swing arm 15 opposite rear wheel 19, said thin plate 34 therefore extending globally parallel to seat tube 2. Flexible plate 34 is fixed to stay 16 and boss 15 by screws 16 for example. Also, it will be noted that thin plate 34 being fixed to seat tube 2 below the fixation of said plate 34 to swing arm 15, underframe 1 is suspended underneath said swing arm 15 so that only traction forces are exerted on plate 34.

Figure 4:
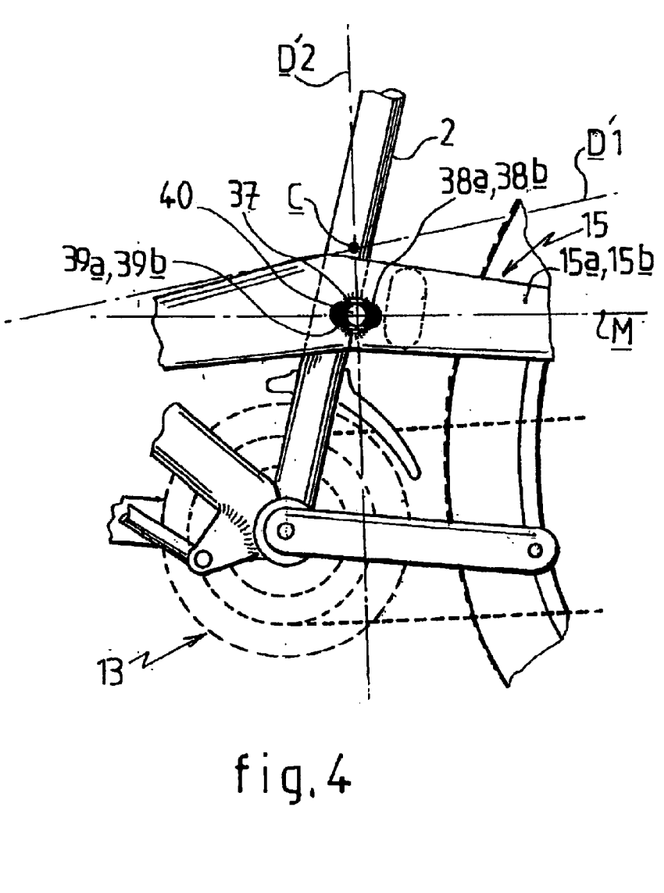
FIG. 4 is a partial side view of a third variant of embodiment of a rear suspension according to the invention fitted to a bicycle.

According to a third variant of embodiment of the rear suspension according to the invention, with reference to FIG. 4, the articulation making swing arm 15 integral with seat tube 2 can advantageously be obtained by an articulation of "Silentbloc" type which is a registered trademark, consisting of a tubular crossbar 37 welded to seat tube 2 so that its axle is parallel to the axle of engaging sprockets 13, two oblong "Silentblocs" 38a, 38b shown in black made in rubber fitted into oblong grooves 39a,39b respectively made in each semi-arm 15a,15b of swing arm 15, and an axle 40 extending within Silentbolocs 38a,38b and within tubular crossbar 37 between semi-arms 15a,15b of swing arm 15. The longitudinal axis M of the oblong grooves 39a,39b extends globally horizontally and "Silentblocs" 38a,38b have maximum elasticity along this same axis M so that axle 40 is able to move inside grooves 39a,39b along this axis. The instantaneous centre of rotation C of swing arm 15 consists of the intersection between straight line D'1 passing through the axles of the articulation means of swing arm 15 towards down tube 3, not shown in this figure, and straight line D'2 orthogonal to major axis M of the articulation of "Silentbloc" type passing through the centre of its axle 40.

Figure 5:
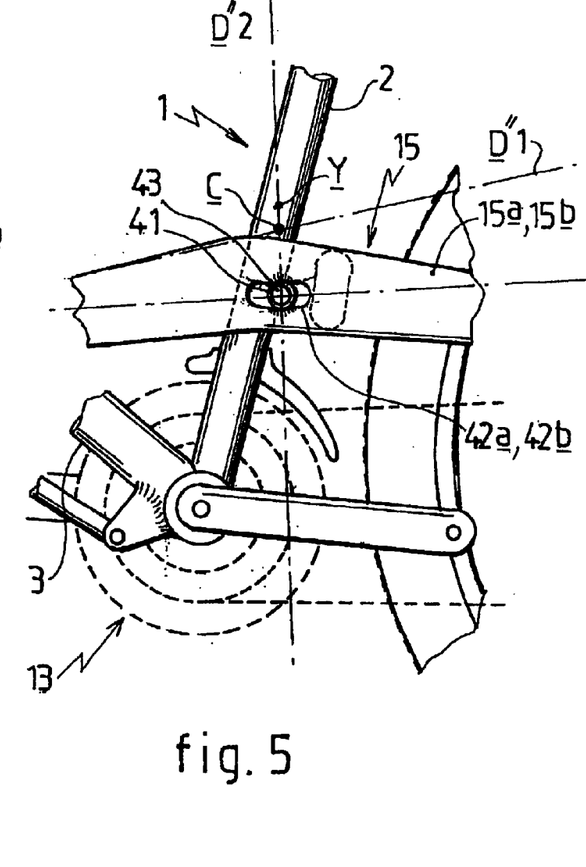
FIG. 5 is a partial side view of a fourth and last variant of embodiment of a rear suspension according to the invention fitted to a bicycle.

According to a last variant of embodiment of the rear suspension according to the invention, with reference to FIG. 5, the articulation means of swing arm 15 relative to underframe 1 of the bicycle comprise a tubular crossbar 41 welded to seat tube 2 so that its axle is parallel to the axle of engaging sprockets 13, two curved orifices 42a,42b made in the two semi-arms 15a,15b of swing arm 15, the concave part of orifices 42a,42b being oriented upwards, i.e. towards the seat, and their longitudinal axes extending globally horizontally, and an axle 43 extending within tubular crossbar 41 and in orifices 42a,42b, said axle 43 being able to slide within the latter. The instantaneous centre of rotation C then consists of the intersection between straight line D"1 passing through the axles of the articulation means of swing tube 15 with down tube 3, not shown in this figure, and straight line D"2 passing firstly through axle 42 and secondly through centre Y of the arc of the circle of orifices 42a and 42b.

Evidently, orifices 41a and 41b may consist of globally rectilinear orifices whose longitudinal axis extends globally horizontally, and the articulation means of swing arm 15 with frame 1 of the bicycle may consist of any equivalent known means while remaining within the scope of the invention.

An explanation will now be given of the functioning of the anti-bobbing system of the invention with reference to FIGS. 6 to 8.

Figure 6:
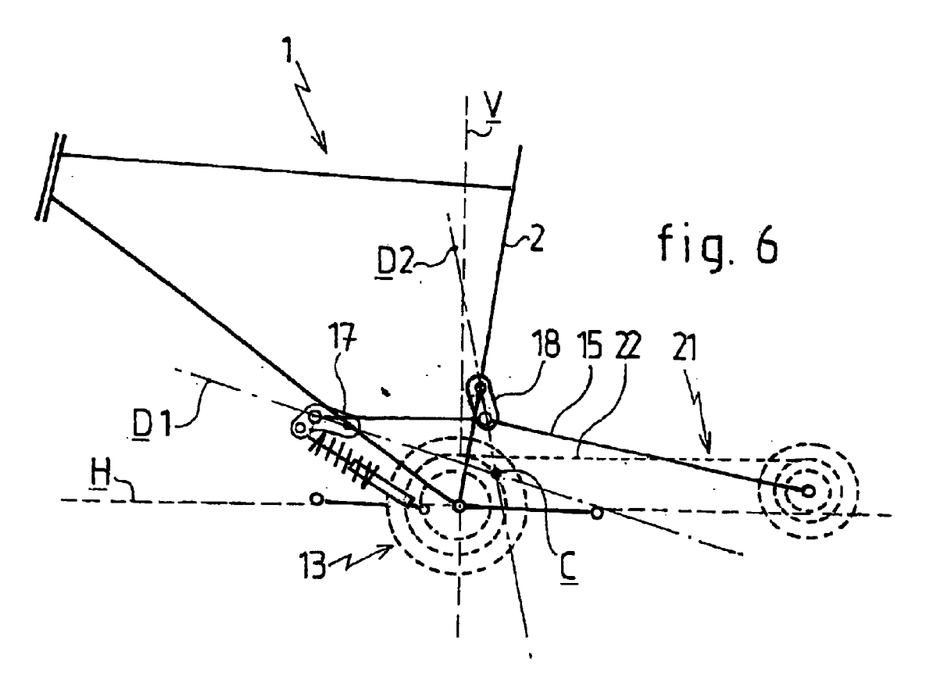
FIG. 6 is a partial schematic diagram of a bicycle fitted with a rear suspension according to the invention shown in non-mounted position.

With reference to FIG. 6, which is a partial schematic view of the non-mounted bicycle shown in FIG. 1, i.e. when the bicycle is resting on the ground with no cyclist, the swing arm 15 is made integral with underframe 1 by the two connecting rods 17 and 18 that are respectively integral with down tube 3 and seat tube 2 so that connecting rod 18 is substantially perpendicular to tensioned strand 22 of chain 21 and the instantaneous centre of rotation C corresponding to the intersection of straight lines D1 and D2 is positioned in the upper posterior quadrant of the point defined by a horizontal axis H and a vertical axis V converging towards the axle of engaging sprocket 13 below the upper strand 22 of chain 21.

Figure 7:
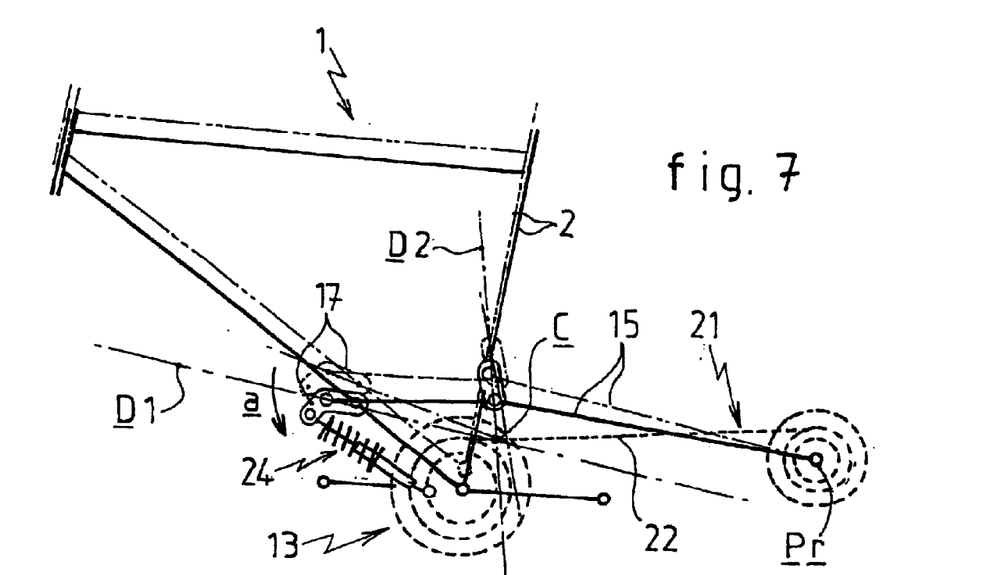
FIG. 7 is a partial schematic diagram of a bicycle fitted with a rear suspension according to the invention in a position of static equilibrium.

When the cyclist mounts the bicycle, i.e. when the cyclist is supported by the seat and/or pedals, with reference to FIG. 7, underframe 1 moves downwards relative to its non-mounted equilibrium shown by the dotted lines, causing rotation of connecting rod 17 in anti-clockwise direction, as indicated by arrow a, until the instantaneous centre of rotation C is located on the upper strand 22 of chain 21, the characteristics of shock absorber 24 being defined in relation to the weight of the cyclist in particular so that in this so-called position of static equilibrium, the upper strand 22 of chain 21 passes through the instantaneous centre of rotation C of swing arm 15. The torque drive provided by the cyclist's pedalling being transmitted to drive wheel 19 via upper strand 22 passing through the centre of rotation of swing arm 15, the moment applied to swing arm 15 is zero, so that the torque drive is fully transmitted to the drive wheel when the cyclist is pedalling.

Figure 8:
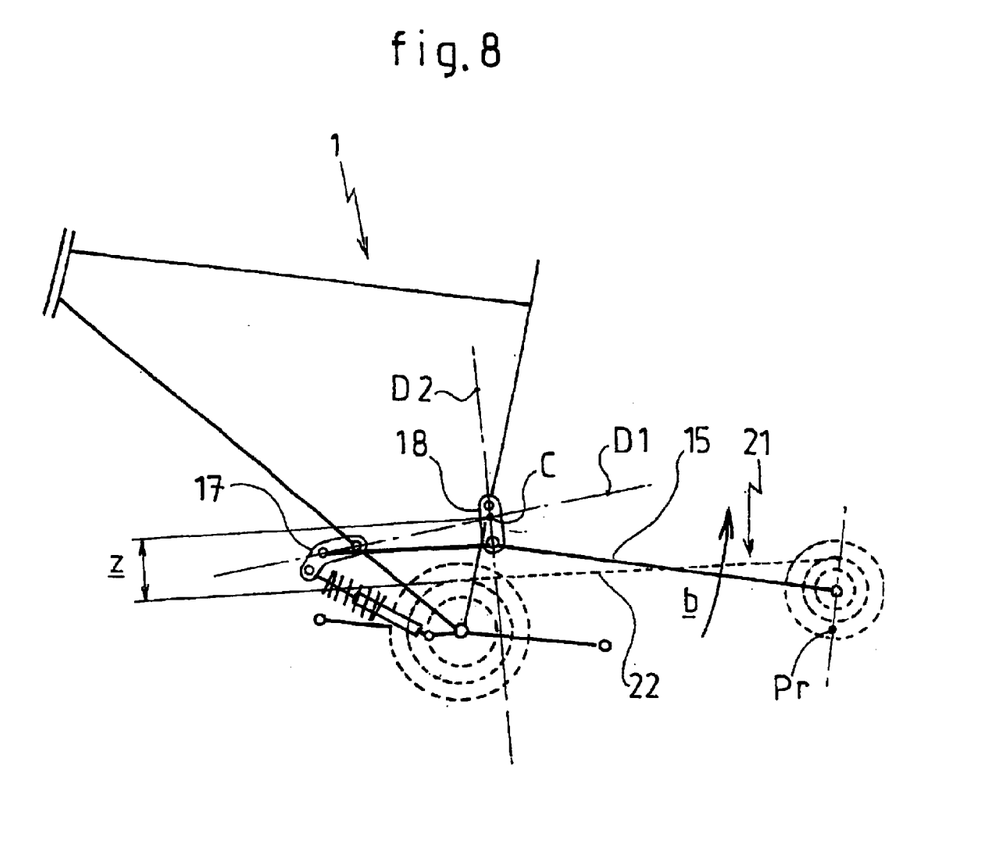
FIG. 8 is a partial schematic diagram of a bicycle comprising a rear suspension according to the invention at the time a bobbing movement is initiated.

When the cyclist changes pedalling cadence, for example when pedalling harder to pick up speed, with reference to FIG. 8, the hub axle 1 of the rear wheel moves globally along a rectilinear pathway, i.e. following an arc of a circle of large radius, in upward direction from a reference position Pr, as indicated by arrow b. Reference position Pr of the hub axle of the rear wheel hub corresponding to the position of said axle when the bicycle is in a position of static equilibrium. Movement of the hub axle of the rear drive wheel causes rotation of swing arm 15 around the instantaneous centre of rotation C which globally moves along straight line D2 which, at each time t, extends globally perpendicular to tensioned strand 22 of chain 21, i.e. its orientation varies little when swing arm 15 rotates. When the hub axle of the rear drive wheel moves upwards, the instantaneous centre of rotation of swing arm 15 moves upwards, so that the upper tensioned strand 22 of chain 21 is located below said instantaneous centre of rotation C, thereby setting up a restoring moment proportional to the tension of upper strand 22 of chain 21 and at a distance Z separating the upper strand 22 from the instantaneous centre of rotation C of swing arm 15, which tends to bring swing arm 15 back to its initial position of static equilibrium. It will be noted that, when swing arm 15 moves downwards, the instantaneous centre of rotation of swing arm 15 moves downwards so that the upper tensioned strand 22 of chain 21 is located above said instantaneous centre of rotation C thereby setting up a restoring moment proportional to the tension of the upper tensioned strand 22 and at a distance separating the latter from the instantaneous centre of rotation C of the swing arm which tends to bring swing arm 15 back to its position of static equilibrium. Therefore, the restoring moment of swing arm 15 towards its position of static equilibrium, irrespective of its direction, opposes the generation of the parasitic bouncing movement called bobbing, at each time t, generated by the cyclist's pedalling. Also, when the drive wheel returns to its initial position Pr of static equilibrium, the instantaneous centre of rotation C of swing arm 15 is again located on the upper strand 22 of chain 21 so that the moment applied to the swing arm 15 is zero.

Evidently the centre of rotation C of swing arm 15 may be fixed, the chassis and/or swing arm then comprising means so that the upper strand 22 of the transmission chain or the straight line extending the same, passes through the centre of rotation of the swing arm, when the vehicle is in a position of static equilibrium, and so that said upper strand 22 is located below the centre of rotation of the swing arm when the hub of the drive wheel is located above its reference position.

In addition, it is obvious that swing arm 15 may consist of a triangular arm, i.e. an arm comprising three tubes welded together to form a triangle, the hub axle of the rear wheel being borne by one of the angles of the triangle, made integral by two connecting rods whose axles are respectively integral with the seat tube and the tube of swing arm 15 opposite the rear wheel hub, while remaining within the scope of the invention.

Finally, the anti-bobbing system of the invention can evidently be adapted to all types of vehicles of the type comprising a chassis, a swing arm integral with the chassis bearing the hub axle of at least one drive wheel, and a shock absorber whose ends are respectively integral with the chassis and the swing arm, such as a motorcycle, a quad or similar, and the examples of vehicles just described are evidently only particular illustrations, that are in no way restrictive, of applications of the anti-bobbing system of the invention.

What is claimed is:

1. Rear suspension of a vehicle, comprising:
   an underframe (1),
   a swing arm (15) integral with the underframe and bearing a hub axle of a drive wheel (19) and a shock absorber (24) whose ends are respectively integral with underframe (1) and swing arm (15),
   the torque drive being transmitted to the drive wheel (19) via a chain (21) extending between an engaging sprocket (13) integral with the underframe (1) and an engaged sprocket (20) integral with the hub axle of the drive wheel (19),
   said chain (21) between the engaging sprocket (13) and the engaged sprocket (20) forming two strands, one tensioned upper strand (22) transmitting the torque drive to the drive wheel (19) and a lower strand (23)
   the underframe (1) being formed of a vertical seat tube (2), of a top tube (4) and a down tube (3),
   the top tube (4) and the down tube (3) being integral with a head tube (5) bearing a fork (6), the axle of the engaging sprocket (13) being positioned at the intersection between the seat tube (2) and the down tube (3) and/or the swing arm (15), and comprising means so that the upper strand (22) of the transmission chain (21) or the straight line extending the same, passes through the instantaneous center of rotation C of the swing arm (15) when the vehicle is in a position of static equilibrium, and so that said upper strand (22) of the chain (21) is positioned below the instantaneous center of rotation C of the swing arm (15) when the hub of the drive wheel (19) is positioned above its reference position Pr corresponding to the position of the hub axle of the drive wheel (19) when the vehicle is in a position of static equilibrium, characterized in that the swing arm (15) is made integral via at least two articulation means (17, 18) with the underframe (1) whose intersection of straight lines D1, D2 passing through rotation axles (17a, 17b, 18a, 18b) of each articulation means (17, 18) is positioned in the upper posterior quadrant of a point defined by a horizontal axis H and a vertical axis V converging towards the axle of the engaging sprocket (13), and in that the ends of the shock absorber (24) are respectively integral with the swing arm (15) or the articulation means (17) joining the swing arm (15) to the down tube (3) and with a hanger (25) of the down tube (3), said hanger (25) extending along the plane containing the tubes (2 to 5) of the underframe (1), said shock absorber (24) extending in front of the down tube (3) between the down tube (3) and the fork (6) bearing the front wheel (8), parallel to the latter or between the tubes (2 to 5) forming the underframe (1) along the plane containing the latter.

2. Rear suspension according to claim 1, characterized in that when the hub axle of drive wheel (19) moves, the instantaneous center of rotation C of the swing arm (15) moves relative to the upper strand (22) of the chain (21) following a straight line.

3. Rear suspension according to claim 2, characterized in that the straight line along which moves the instantaneous center of rotation C of the swing arm (15), extends perpendicular to the upper strand (22) of the chain (21).

4. Rear suspension according to claim 1, characterized in that the swing arm (15) is integral with the underframe (1) via two connecting rods (17, 18) extending perpendicular relative to one another.

5. Rear suspension according to claim 4, characterized in that connecting the connecting rods (17, 18) are respectively integral with the seat tube (2) and the down tube (3) of the underframe (1).

6. Rear suspension according to claim 4, characterized in that at least one of the connecting rods (17, 18) extends vertically when the vehicle is in a position of static equilibrium.

7. Rear suspension according to claim 1, characterized in that the underframe (1) and/or the shock absorber (24) comprise means to vary the position of the instantaneous center of rotation C of the swing arm (15) so that in a position of static equilibrium the upper strand (22) of the chain (21) or the straight line extending the same passes through the instantaneous centre of rotation C of the swing arm (15) irrespective of the size of the engaging and/or engaged sprocket.

8. Rear suspension according to claim 7, characterized in that the underframe (1) comprises means to vary the position of the rotation axle (17a, 17b, 18a, 18b) of at least one of the connecting rods (17,18) joining the swing arm (15) to the underframe (1).

9. Rear suspension according to claim 7, characterized in that the shock absorber (24) comprises means to adjust its stiffness.

10. Rear suspension according to claim 7, characterized in that the means for varying the position of the instantaneous center of rotation C of the swing arm (15) are piloted by control means (31, 32) of a front and/or a rear derailleur (33).

11. Rear suspension according to claim 5, characterized in that at least one of the connecting rods (17, 18) extends vertically when the vehicle is in a position of static equilibrium.

12. Rear suspension according to claim 8, characterized in that the means for varying the position of the instantaneous center of rotation C of the swing arm (15) are piloted by control means (31, 32) of a front and/or a rear derailleur (33).

13. Rear suspension according to claim 9, characterized in that the means for varying the position of the instantaneous center of rotation C of the swing arm (15) are piloted by control means (31, 32) of a front and/or a rear derailleur (33).

* * * * *